US008836996B2

(12) United States Patent
Murakoshi (10) Patent No.: US 8,836,996 B2
(45) Date of Patent: Sep. 16, 2014

(54) IMAGE FORMING APPARATUS, MANAGEMENT METHOD OF IMAGE FORMING PROCESSING, AND COMPUTER-READABLE RECORDING MEDIUM ON WHICH PROGRAM IS RECORDED

(75) Inventor: Daisuke Murakoshi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 513 days.

(21) Appl. No.: 13/149,052

(22) Filed: May 31, 2011

(65) Prior Publication Data

US 2011/0292421 A1   Dec. 1, 2011

Related U.S. Application Data

(60) Provisional application No. 61/350,261, filed on Jun. 1, 2010.

(51) Int. Cl.
| | |
|---|---|
| G06F 15/00 | (2006.01) |
| G06K 15/00 | (2006.01) |
| G03G 15/00 | (2006.01) |
| G06K 15/02 | (2006.01) |
| G03G 15/01 | (2006.01) |
| B41J 2/00 | (2006.01) |

(52) U.S. Cl.
CPC .......... *G06K 15/408* (2013.01); *G06K 15/4065* (2013.01); *G03G 15/556* (2013.01); *G06K 15/407* (2013.01); *G03G 15/55* (2013.01); *G06K 15/1868* (2013.01); *G06K 15/002* (2013.01); *G03G 15/0142* (2013.01); *B41J 2/00* (2013.01)
USPC ................ 358/1.9; 358/501; 358/504; 347/7; 271/9.02; 271/9.03; 271/9.06

(58) Field of Classification Search
CPC ............. B41J 2002/17569; B41J 2002/17589; H04N 1/2346; H04N 1/32609; G06K 15/407; G06K 15/4065
USPC ............... 358/1.9, 501, 504; 347/7; 271/9.01, 271/9.02, 9.03, 9.05, 9.06
See application file for complete search history.

(56) References Cited

U.S. PATENT DOCUMENTS

| | | | | | |
|---|---|---|---|---|---|
| 5,349,377 | A | * | 9/1994 | Gilliland et al. | ............... 347/131 |
| 6,058,207 | A | * | 5/2000 | Tuijn et al. | ..................... 382/162 |
| 6,196,663 | B1 | * | 3/2001 | Wetchler et al. | ................ 347/43 |
| 2005/0083371 | A1 | * | 4/2005 | DeBaer | ............................ 347/43 |
| 2008/0174810 | A1 | * | 7/2008 | Kim et al. | ..................... 358/1.15 |
| 2008/0195663 | A1 | | 8/2008 | Sekine | |

FOREIGN PATENT DOCUMENTS

| | | |
|---|---|---|
| JP | 2008-183739 | 8/2008 |
| JP | 2008-194953 | 8/2008 |
| JP | 2009-043247 | 2/2009 |
| JP | 2009-181275 | 8/2009 |

* cited by examiner

*Primary Examiner* — Jamares Q Washington
(74) *Attorney, Agent, or Firm* — Amin, Turocy & Watson, LLP (57) ABSTRACT

The embodiment described herein can prompt setting of processing conditions to be set by using a display of a weight value used in a quota function. There is provided an image forming apparatus, including: a residual amount detection unit that detects a residual amount of each disposable product; a residual amount information acquisition unit that acquires residual amount information; a determination unit that determines whether there are the disposable products in which a residual amount is disproportionately small; a weight value setting unit that sets the weight value used for weighting so that the weighting for calculating the processing amount of the image forming processing corresponding to setting conditions not using the disposable products having a disproportionately small residual amount is relatively smaller than the weighting corresponding to other setting conditions; and a display control unit that displays the set weight value on a screen.

18 Claims, 7 Drawing Sheets

| ITEM | PROCESSING CONDITION | WEIGHT VALUE |
|---|---|---|
| PAPER SIZE | A4 | ×1 |
| | A3 | ×2 |
| | B5 | ×1 |
| | B4 | ×2 |
| COLOR/BLACK AND WHITE | COLOR | ×2 |
| | BLACK AND WHITE | ×1 |
| | TWO COLORS (BLACK, MAGENTA) | ×1 |
| | TWO COLORS (BLACK, CYAN) | ×1 |
| ONE SIDE/ BOTH SIDES | ONE SIDE | ×1 |
| | BOTH SIDES | ×1 |
| TONER SAVE MODE | OFF | ×1 |
| | ON | ×0.8 |

IMAGE FORMING APPARATUS, MANAGEMENT METHOD OF IMAGE FORMING PROCESSING, AND COMPUTER-READABLE RECORDING MEDIUM ON WHICH PROGRAM IS RECORDED

CROSS-REFERENCE TO RELATED APPLICATIONS

This application is based upon and claims the benefit of priority from U.S. provisional application 61/350,261, filed on Jun. 1, 2010; the entire contents of which are incorporated herein by reference.

FIELD

Embodiments described herein relate generally to condition setting processing of image forming processing in an image forming apparatus.

BACKGROUND

In the related art, in an image forming apparatus such as a multi-function peripheral (MFP), regardless of the state of the image forming apparatus, as long as the conditions of image forming processing are usable, a user may freely set and select the conditions and perform image forming processing.

In detail, if copy processing is performed, selection of black and white copy and color copy, selection of a sheet size, selection of layout printing (N in 1 printing) or duplex printing, or the like, may be performed by an operation input to an operation panel of the image forming apparatus. Further, if the printing processing is printing processing in which a printing job is received from a client and performed, the same conditions may be set and selected in a printer driver.

At this time, in the related art, when disposable products such as sheets, toner or ink, are exhausted, a display to the effect that these disposable products are exhausted is performed in the image forming apparatus and the performance of the copy processing or the printing processing is inhibited or stopped.

In this case, for example, in the image forming apparatus using toner of yellow (Y), magenta (M), cyan (C), and black (K), a residual amount of toner may be disproportionate according to the contents of the image forming processing and an exchange operation of a toner cartridge may be frequently performed at a timing when toner is not present.

DETAILED DESCRIPTION

Hereinafter, according to an embodiment, an image forming apparatus includes a residual amount detection unit, a residual amount information acquisition unit, a determination unit, a weight value setting unit, and a display control unit.

The residual amount detection unit detects a residual amount of each disposable product that is accommodated in a plurality of disposable product accommodation units each of which accommodates a plurality of kinds of disposable products. The residual amount information acquisition unit acquires residual amount information displaying a residual amount of disposable products from the residual amount detection unit. The determination unit determines whether there are any disposable products in which the residual amount is disproportionately small in the plural kinds of disposable products, based on the residual amount information acquired by the residual amount information acquisition unit. If the determination unit determines that the disposable products in which the residual amount is disproportionately small are present, the weight value setting unit sets the weight value used for weighting so that the weighting for calculating the processing amount of the image forming apparatus corresponding to setting conditions not using the disposable products, for which it is determined as having a disproportionately small residual amount, is relatively smaller than the weighting corresponding to other setting conditions, among the setting conditions of the image forming processing in limitation processing that limits the executed image forming processing to a predetermined processing amount set in advance. The display control unit displays the set weight value on a screen when the weight value is set by the weight value setting unit.

Hereinafter, an embodiment will be described with reference to the accompanying drawings.

(First Embodiment)

Figure 1:
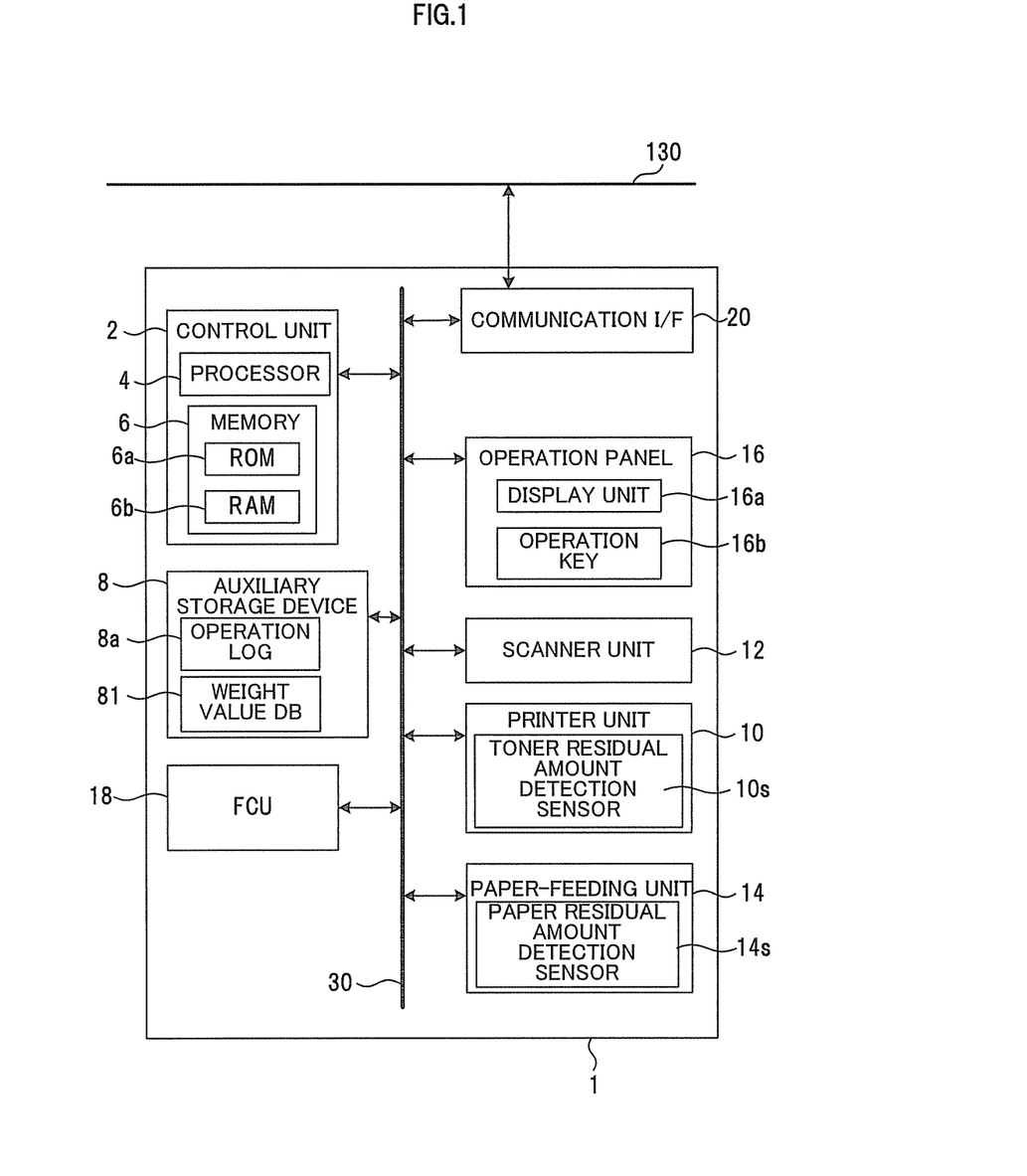
FIG. 1 is a block diagram explaining a configuration of an image forming apparatus.

FIG. 1 is a block diagram explaining a configuration of an image forming apparatus 1 according to a first embodiment.

The image forming apparatus 1 includes a control unit 2, an auxiliary storage device 8, a printer unit 10, a scanner unit 12, a paper-feeding unit 14, an operation panel 16, a facsimile control unit (FCU) 18, and a communication interface (communication I/F) 20. Each component of the image forming apparatus 1 is connected to each other via a bus 30. The image forming apparatus 1 is connected to a network 130 via the communication I/F 20 and is connected to external devices such as a client terminal, or a server, via the network 130.

The control unit 2 functions through a processor 4, a memory 6, and an operating system (OS).

The processor 4 is a central processing unit (CPU) or a micro processing unit (MPU).

The memory 6 is a so-called main storage device. The memory 6 is, for example, a semiconductor memory. The memory 6 includes a read only memory (ROM) 6a storing a control program of the processor 4 and a random access memory (RAM) 6b providing a temporary working region to the processor 4.

The control unit 2 controls the printer unit 10, the scanner unit 12, the paper-feeding unit 14, the operation panel 16, the FCU 18, the communication I/F 20, or the like, based on the control program, or the like, stored in the ROM 6a or the auxiliary storage device 8. The control unit 2 may further have various image processing functions.

Further, the control unit 2 may also include an application specific integrated circuit (ASIC) that implements a portion or all of the functions included in the image forming apparatus 1.

Further, the control unit 2 of the first embodiment includes a function called a quota function.

Here, the 'quota function' in the first embodiment will be described below. The quota function is a function of allocating the processing amount (hereinafter, the processing amount of the image (forming) processing permitted in a predetermined period is referred to as a quota value in the image forming apparatus) of the image (forming) processing permitted in a predetermined period in the image forming apparatus in an image formation apparatus unit or a user or a predetermined group unit. For example, if the quota value that is the processing amount in one month permitted in the image forming apparatus 1 is 100 points, the image processing of the processing amount corresponding to 100 points may be performed in one month in the image forming apparatus.

Further, in the quota function of the first embodiment, the processing amount in one-time image processing is calculated as a weighted value corresponding to the set conditions in the image processing. In detail, for example, if the processing amount of the printing reference corresponding to a sheet of paper is 1 point based on the copy job or the printing job, the processing amount of the executed image processing is calculated by multiplying (one time, double, 0.8 times, or the like) the weight values according to the setting conditions, or the like, of a paper size or a kind of paper, designation of color printing or black and white printing, layout printing setting (N in 1 setting) printing a plurality of pages on one sheet.

For example, when the paper size is A4, the paper type is thick paper, the printing is black and white, and one sheet is printed by the layout printing (2 in 1 printing) setting that prints data corresponding to 2 pages on a sheet of paper, the processing amount becomes $1 \times 1 \times 2 \times 1 \times 0.8 = 1.6$ providing the reference value is 1, the weight value of A4 is one time, the weight value of the thick paper designation is double, the weight value of the black and white printing is one time, and the weight value of 2 in 1 printing is 0.8 times. Therefore, for example, if the quota value immediately before the printing processing is 100, the quota value after the printing processing becomes $100-1.6=98.4$. At this time, if the quota value after subtraction is 0 or more, the printing is permitted, but if the quota value after the subtraction is below 0, the quota value is insufficient and the printing stops due to the processing exceeding the processing amount permitted in the predetermined period.

Further, in the following description, although the quota function is described as a method of subtracting the processing amount of each image processing from the quota value, the quota function is not limited thereto. An addition method that limits the image forming processing if the sum of the processing amount exceeds the quota value by adding the processing amount of each image processing may also be allowed.

The auxiliary recording device 8 stores the application program and OS. The application program includes program executing functions that are included in the image forming apparatus 1, such as a copy function, a print function, a scanner function, a facsimile function, or a network file function. The application program may also include application (web browser) for web client or other applications.

Further, the auxiliary storage device 8 stores an operation log 8a showing an operation situation in the image forming apparatus 1. The operation log includes information indicating the contents of the executed processing, the contents of the operation abnormality such as paper jamming, or the like. The log of the paper jamming includes, for example, the place and time where the paper is jammed, or the like.

Further, the auxiliary storage device 8 stores the quota value. When the image forming processing is performed, the value corresponding to the processing amount of the processing is subtracted from the quota value that is stored in the auxiliary storage device 8. Further, the quota value may be managed by being stored in a storage region of the external devices such as the print server connected via the network 130, without being necessarily stored in the auxiliary storage device 8.

The auxiliary storage device 8 stores image data generated by reading a document in the scanner unit 12, data acquired from the external devices connected to the communication I/F 20 via the network 130, or the like. Further, the auxiliary storage device 8 may temporarily store the printing job transmitted from the external client terminal, or the like, connected via the network 130 until being executed as the printing job.

Figure 2:
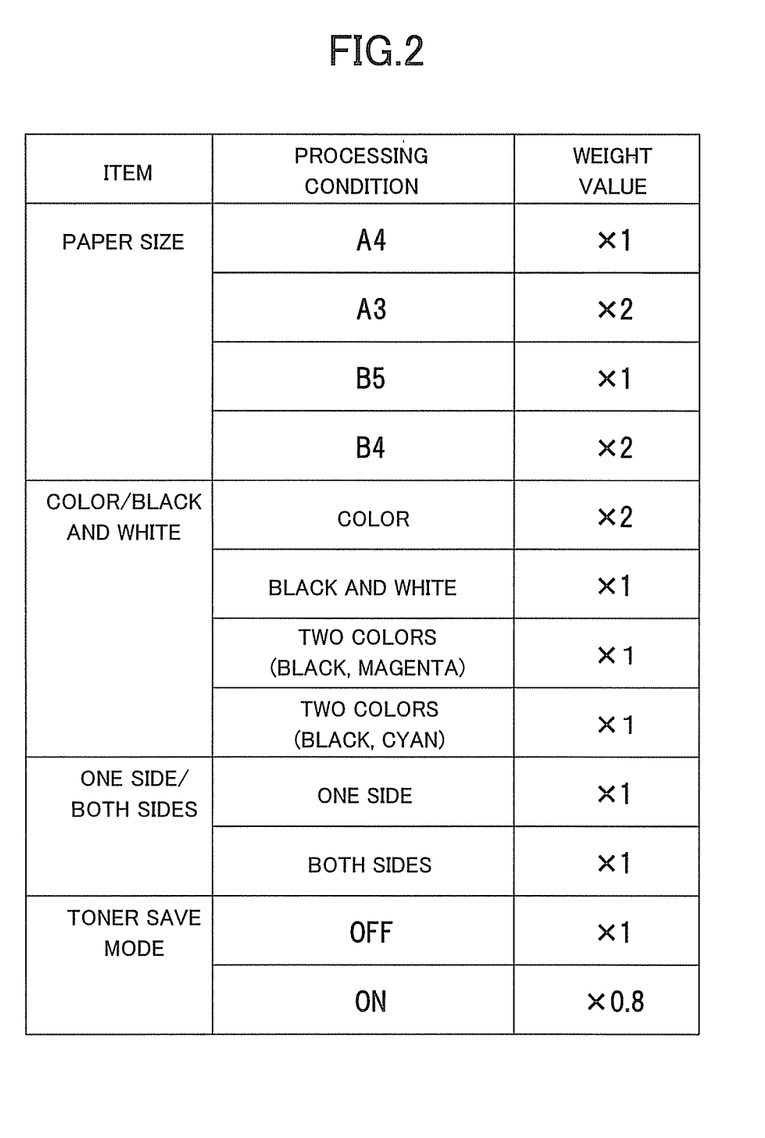
FIG. 2 is a diagram showing an example of a data arrangement of a weight value DB stored in an auxiliary storage device.

Further, the auxiliary storage device 8 of the first embodiment includes a weight value database (hereinafter, weight value DB) 81. The weight value DB 81 stores the weight value used when the processing amount of the image forming processing is calculated in the above-mentioned quota function. FIG. 2 shows an example of a data arrangement of the weight value DB 81 stored in the auxiliary storage device 8. In the weight value DB 81, for example, as shown in FIG. 2, the processing conditions to be set correspond to the weight value, for each setting item. When the image forming processing is performed, the calculation of the processing amount of the image processing executed by the image forming job by multiplying the weight value corresponding to the setting conditions set in the image forming job such as the copy job, or the printing job, by the reference value is as described above.

An example of the auxiliary storage device 8 may include a magnetic storage device such as a hard disk drive, an optical storage device, a semiconductor storage device (flash memory, or the like) or any combination of these storage devices.

The printer unit 10 forms the image on paper, based on the image data generated by reading a document by the scanner unit 12 or the data acquired from the external devices such as the client terminal. The image forming apparatus 1 according to the first embodiment is an image forming apparatus of an electrophotographic method. For this reason, the printer unit 10 includes a process unit including a toner cartridge, a photoreceptor, or the like, an intermediate transfer belt, a fixing unit, or the like. The process unit includes four process units corresponding to four-color toner of, for example, yellow (Y), magenta (M), cyan (C), and black (K).

Further, the printer unit 10 according to the first embodiment includes a toner residual amount detection sensor 10s. The toner residual amount detection sensor 10s detects the residual amount of toner in the toner cartridge that accommodates toner of each color.

The scanner unit 12 includes a scanning reading unit embedded therein that reads the document as the image, a document mounting stand, and an automatic document carrying device that carries a document to a reading position. The scanning reading unit of the scanner unit 12 reads the document set in the document mounting stand or the automatic document carrying device.

The paper-feeding unit 14 feeds paper for forming an image to the printer unit 10. The paper-feeding unit 14 includes a paper-feeding cassette, a pick-up roller, a carrying roller, or the like. The paper-feeding cassette accommodates paper. The image forming apparatus 1 of the first embodiment includes a plurality of paper-feeding cassettes. Each of the paper-feeding cassettes may accommodate paper having different sizes. The pick-up roller takes out the paper accommodated in the paper-feeding cassette one sheet at a time. The carrying roller carries the paper taken out by the pick-up roller to the printer unit 10.

Further, the paper-feeding unit 14 of the first embodiment includes a paper residual amount detection sensor 14s. The paper residual detection sensor 14s detects the residual amount of paper in the paper-feeding cassette.

The operation panel 16 includes a display unit 16a of a touch panel type and various kinds of operation keys 16b. The display unit 16a displays instruction items regarding the printing conditions, such as paper size, the number of copy sheets, printing density setting, or finishing (binding, folding). The operation panel 16b includes a numerical keypad, a reset key, a stop key, a start key, or the like. The user may perform an instruction by inputting the instruction for various processes or the items displayed on the display unit 14a from the display unit 16a or the operation key 16b.

The facsimile control unit (FCU) 18 controls the transmission or the reception of the facsimile in the image forming apparatus 1.

The communication I/F 20 is an interface that connects the image forming apparatus 1 to the network 130. The communication I/F 20 communicates with the external devices via the network 130 by appropriate wireless communication or wired communication based on, for example, Bluetooth (registered trademark), infrared connection, IEEE 802.15, IEEE 802.11, IEEE 802.3, IEEE 1284, or the like, called optic connection. The communication I/F 20 includes a buffer and temporarily maintains a portion or all of the data received via the network 130 to the buffer. The control unit 2 communicates with the external devices such as the client terminal connected through the network 130 via the communication I/F 20.

The image forming apparatus 1 of the first embodiment is configured as described above.

Figure 3:
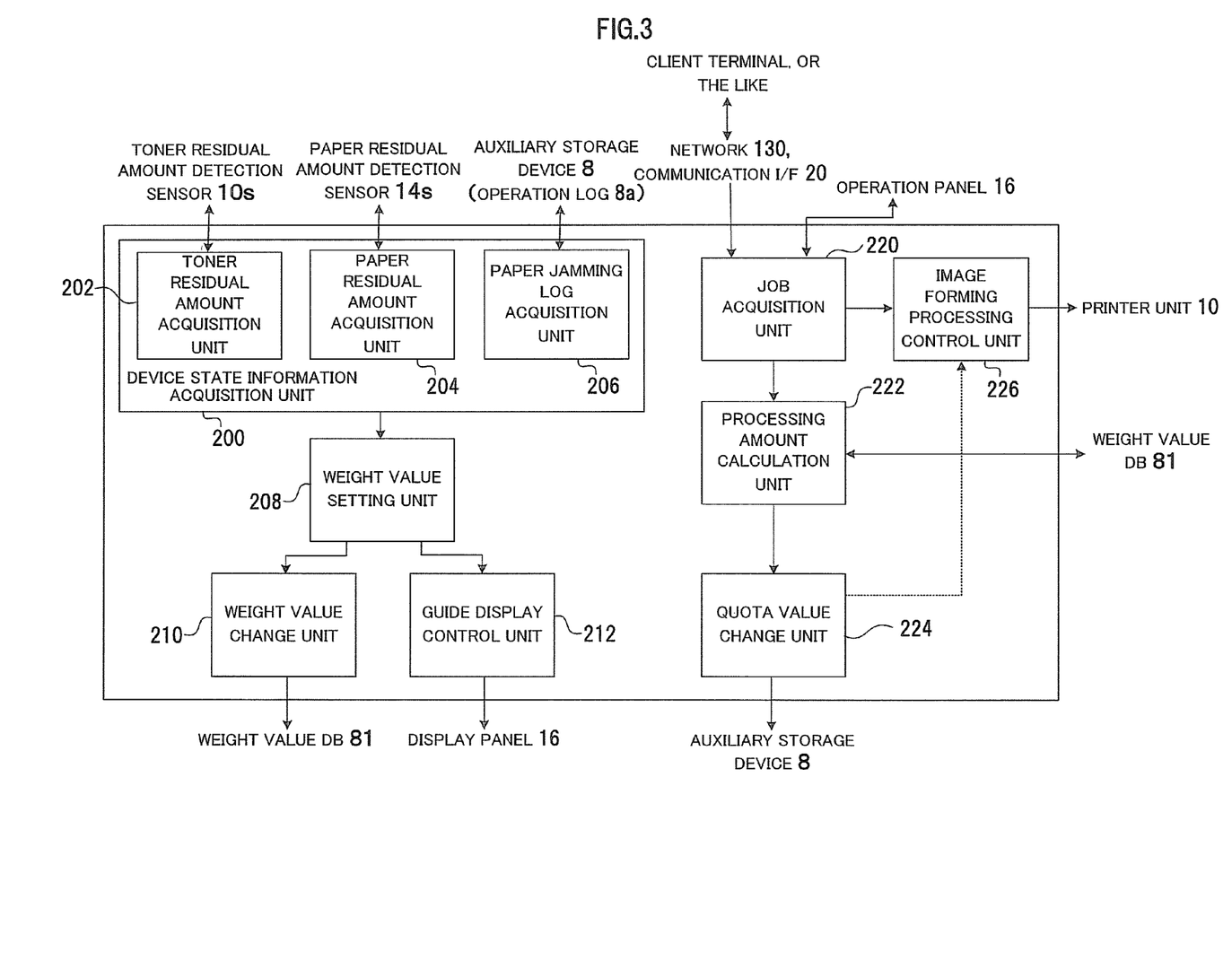
FIG. 3 is a functional block diagram showing a function of the image forming apparatus.

Next, the processing regarding the quota function according to the image forming apparatus 1 of the first embodiment will be described. FIG. 3 shows a functional block diagram showing the functions included in the image forming apparatus 1.

The image forming apparatus 1 includes a device state information acquisition unit 200, a weight value setting unit 208, a weight value change unit 210, a guide display control unit 212, a job acquisition unit 220, a processing amount calculation unit 222, a quota value change unit 224, and an image forming processing control unit 226.

The device state information acquisition unit 200 acquires various items of information showing the state of the image forming apparatus 1. The device state information acquisition unit 200 of the first embodiment includes a toner residual amount acquisition unit 202, a paper residual amount acquisition unit 204, and a paper jamming log acquisition unit 206.

The toner residual amount acquisition unit 202 acquires information displaying the toner residual amount of the toner cartridge of each color from the toner residual amount detection sensor 10s.

The paper residual amount acquisition unit 204 acquires information indicating the residual amount of paper in each paper cassette from the paper residual amount detection sensor 14s.

The paper jamming log acquisition unit 206 acquires a log showing a paper jamming situation included in the operation log that is stored in the auxiliary storage device 8.

The weight value setting unit 208 determines the weight value used for weighting for calculating the processing amount of the image forming processing for executing the quota function based on the information showing the state of the image forming apparatus 1 acquired by the device state information acquisition unit 200. The weight value setting unit 208 may increase the weight value corresponding to the setting conditions using toner or paper, for example, when there is a toner cartridge or a paper-feeding cassette having a small residual amount. Thereby, the timing at which toner or paper having a small residual amount becomes exhausted may be delayed by allowing a user to prompt the selection of the setting conditions other than the setting conditions in which the weight value becomes large.

Further, the weight value setting unit 208 may increase the weighting by simply increasing the weight value of the setting condition having a small residual amount as described above as well as performing the setting processing of the weight value that prompts the setting of the processing conditions to remove the disproportionate consumption state of the disposable products. In detail, for example, yellow toner is reduced by a predetermined value or more (or a predetermined ratio or more) in a residual amount, as compared with magenta, cyan, and black toners and when the residual amount of the yellow toner is too little, the weight value setting unit 208 may reduce the weight value corresponding to the black and white printing not using the yellow toner or two-color printing using toner other than yellow, as compared with the weight value in the general case in which the residual amount is not disproportionate. Of course, the weight value setting unit 208 may prompt the user to set processing conditions using a toner other than yellow, instead of decreasing this weight value or decreasing this weight value and increasing the weight value corresponding to the conditions using the yellow toner.

Further, as described above, the state in which the residual amount is disproportionately small is not limited to the case in which the residual amount of any toner is reduced by a predetermined value (a predetermined ratio) or more, as compared with the residual amount of other toners, but, for example, may be allowed even in a case in which the residual amount is reduced by a predetermined amount (or a predetermined ratio) or more, as compared with an average value of the residual amount of each disposable product.

Further, if the residual amount of paper is disproportionate, when there is the paper-feeding cassette in which the residual amount is reduced by the predetermined amount or more (or a predetermined ratio or more) as compared with the residual amount of paper of other paper-feeding cassettes, the weight value setting unit 208 may increase the weight value of the paper size corresponding to the paper-feeding cassette in which the residual amount is smaller or reduce the weight value of the paper size corresponding to other paper-feeding cassettes in which the residual amount is larger.

For the log showing the situation of the paper jamming, for example, when the frequency of the paper jamming is high in the duplex printing unit performing the duplex printing within a predetermined period (or, when the frequency of the paper jamming is equal to or more a predetermined frequency), the weight value setting unit 208 may increase the weight value of the duplex printing so as to allow the user to remove the setting of the duplex printing.

The weight value change unit 210 changes each weight value registered in the weight value DB 81 to weight values that are newly set by the weight value setting unit 208. For example, when the residual amount of the yellow toner is reduced by the predetermined amount or more as compared with other toners, and when the weight values of two-color printing of black and magenta that do not use yellow are set to a smaller value (for example, "0.8") than a general weight value (for example, "1") by the weight value setting unit 208, the weight value of the two-color printing of black and magenta is changed to the smaller weight value set.

Figure 4:
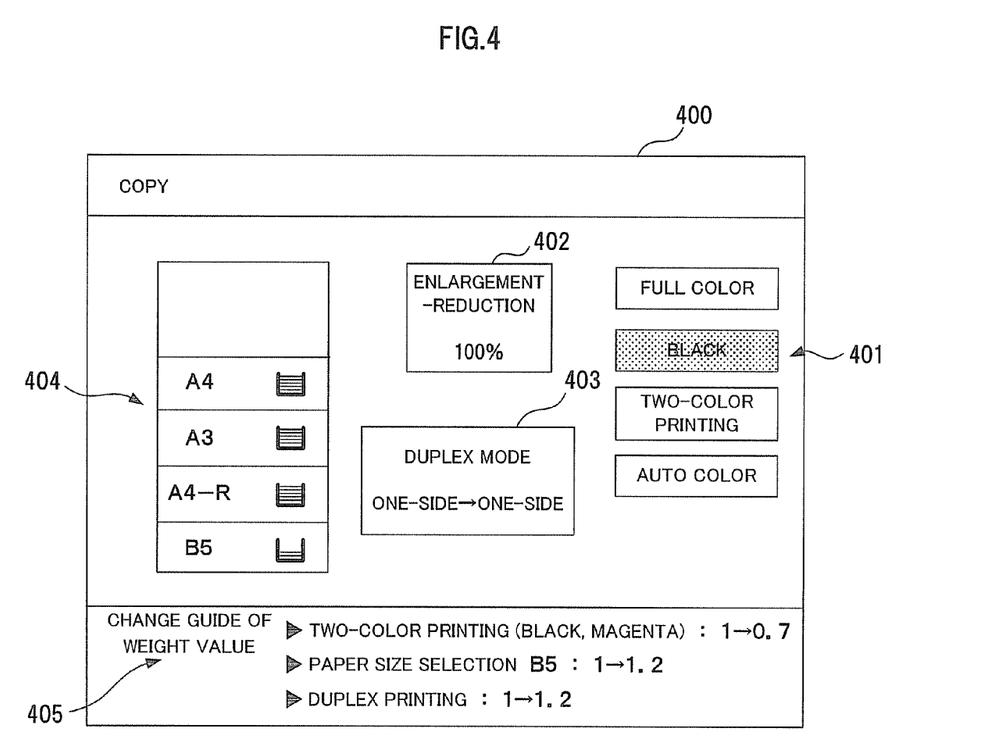
FIG. 4 is a diagram showing an example of a display screen displayed on a display unit of the image forming apparatus.

As described above, when different weight values from the general weight value are set by the weight value setting unit 208, the guide display control unit 212 displays a display of guiding the changed ones on the display unit 16a of the display panel 16. In this case, FIG. 4 shows a display screen 400 on the display unit 16a on which the guide display is made. The display screen 400 displays a display 401 of a selection state of color and black and white, a display 402 showing a ratio of enlargement and reduction, a display 403 displaying a designated state of a duplex printing mode, a display 404 of the size and residual amount of paper accommodated in each paper-feeding cassette, or the like. Further, a weight value changing guide 405 showing that the weight value is changed is displayed on the bottom portion of the display screen 400. FIG. 4 shows, for example, the case in which the weight value of the two-color printing of black and magenta becomes small and the weight value becomes large when paper of B5 is used and when the duplex printing is designated. Through the guide display, the user may designate the two-color printing of black and magenta, the paper size other than B5, or prompt the removal of the duplex printing so that the reduction amount of the quota value is small due to the processing performed by the user.

Next, the job acquisition unit 220 acquires the image formation job, such as the printing job from the client terminal, or the copy job generated by the operation input in the operation panel 16.

The processing amount calculation unit 222 calculates the processing amount of the job from the setting conditions set in the image forming job acquired by the job acquisition unit 220. In detail, various setting conditions included in the image forming job are extracted and the weight values corresponding to the setting conditions are acquired from the weight value DB 81. Further, these weight values are multiplied by the reference value of the processing amount of the image forming processing, thereby calculating the processing amount in the image forming job.

The quota value change unit 224 changes the quota value to a quota value after the execution of the image forming job by subtracting the processing amount in the image forming job from the present quota value stored in the auxiliary storage device 8.

The image forming processing control unit 226 executes the image forming processing on the printer unit 10, based on the image forming job acquired by the job acquisition unit 220.

Further, the quota value change unit 224 instructions the image forming processing control unit 226 to execute the image forming processing when the quota value is 0 or more as a result of subtracting the processing amount of the image forming job from the quota value and the image forming processing control unit 226 may execute the image forming processing only when there is an instruction from the quota value change unit 224 (the instruction is shown by a dotted arrow in FIG. 3).

Figure 5:
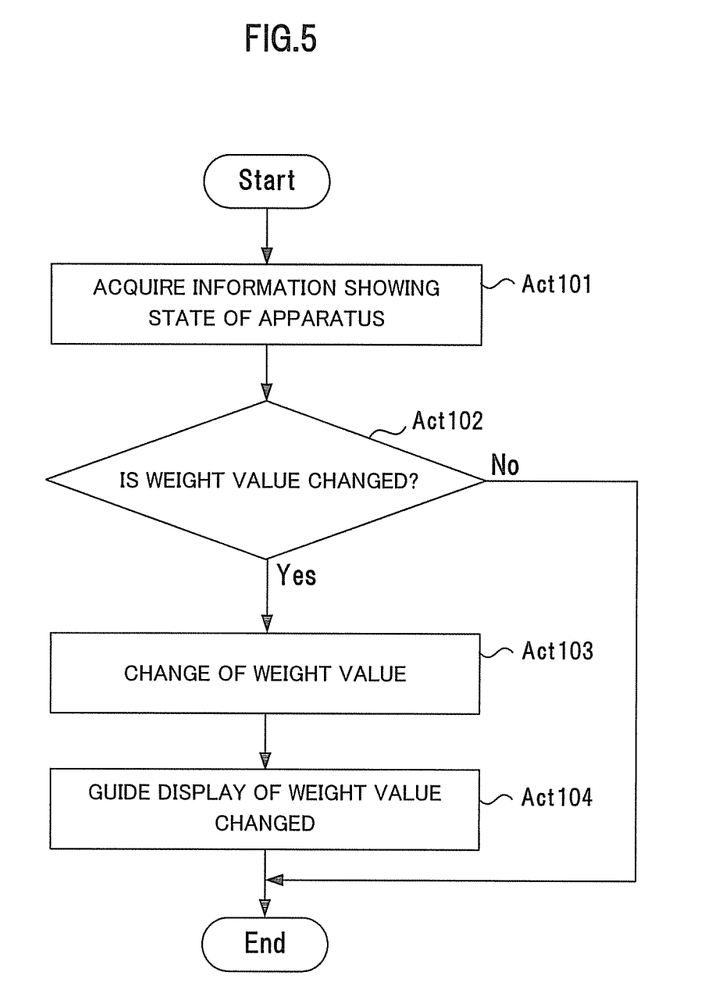
FIG. 5 is a flow chart showing a flow of processing regarding a quota function.

Next, a flow of the processing regarding the quota function of the first embodiment will be described. FIG. 5 is a flow chart showing a flow of the processing regarding the quota function.

First, the device state information acquisition unit 200 acquires the information showing the state of the image forming apparatus 1 at a preset timing such as when power is applied to the image forming apparatus 1, or the like, or a preset period (Act 101). In detail, the toner residual amount acquisition unit 202 acquires the information showing the residual amount of each toner from the toner residual amount detection sensor 10s. Further, the paper residual amount acquisition unit 204 acquires the information showing the paper residual amount from the paper residual amount detection sensor 14s. Further, the paper jamming log acquisition unit 206 acquires the paper jamming log from the operation log stored in the auxiliary storage device 8.

Next, the weight value setting unit 208 determines whether there is a need to newly set a weight value by changing the current weight value, based on the information acquired in the device state information acquisition unit 200 (Act 102). For example, when the toner of the specific color is reduced by the predetermined amount (or the predetermined ratio) or more as compared with toner of other colors from the information showing the toner residual amount acquired by the toner residual amount acquisition unit 202, the weight value setting unit 208 reduces the weight value of the setting conditions not using toner having a small residual amount or increases the weight value of the setting conditions using toner having a small residual amount. Further, the weight value setting unit 208 may reduce the weight value of the setting conditions that do not pass paper through a place where the paper jamming may easily occur or increase the weight value of the setting conditions that pass paper through the place, based on the paper jamming log, when the frequency or the number of times of the paper jamming is larger than the predetermined value in the specific place.

Next, when the weight value setting unit 208 sets a new weight value different from the general weight value (Yes in Act 102), the weight value change unit 210 changes the weight value registered in the weight value DB 81 to the newly set weight value (Act 103).

Further, when the weight value setting unit 208 changes the weight value in order to be newly set (Yes in Act 102), the guide display control unit 212 performs the screen display guiding the changed weight value (Act 104).

In Act 102, when the weight value is changed (No in Act 102), the processing ends without changing the weight value and performing the guide display.

The flow of the processing regarding the quota function in the image forming apparatus 1 of the first embodiment is described above. Further, Act 103 and Act 104 are not necessarily performed in the order shown in FIG. 5 and therefore, both processes may be simultaneously performed.

According to the image forming apparatus 1 of the first embodiment as described above, the weight value of the setting conditions of the image forming processing using the disposable products having a small residual amount is changed to be relatively large, as compared with the weight value of the setting conditions of the image forming processing using ones other the disposable products having a small residual amount and the changed ones may be displayed on the screen and informed to the user. Further, through the display, the user may prompt the conditions having the smaller weight value to be set at the time of the image forming processing. If the user selects the conditions changed to the smaller weight value, the reduction in the disposable products having the small residual amount may be suppressed, for example, the timing of the exchange of the toner cartridge or the loading of paper may be delayed.

Further, the weight value setting unit 208 relatively increases the weight value of the setting conditions using toner or paper having a small residual amount by a predetermined amount (or a predetermined ratio) or more when the variation in the residual amount is large in the residual amount of toner of each color or the residual amount of paper of each size, thereby prompting the user to restrict the use of toner or the like having the small residual amount. Thereby, the variation in the residual amount of the disposable products may be small. When the variation in the residual amount of the disposable products is small, the exchange or the supplement of the disposable products may be performed together and the frequency of maintenance may be reduced.

Meanwhile, for example, when the variation in the residual amount of toner is large, if there is no quota function as described above, the timing of exchanging the toner is random and the frequency of the maintenance work such as the exchange operation of toner is increased.

Further, the first embodiment describes the case in which the weight value is changed as one displayed on the display panel 16 of the image forming apparatus 1, but is not limited thereto. For example, the user may display one in which the weight value is changed on the screen of the print driver that starts in order to perform the printing from the client. Thereby, similarly, when the conditions of the printing such as color, black and white, or paper size, are set, it is possible to prompt the selection of the conditions having the small weight value.

(Second Embodiment)

Figure 6:
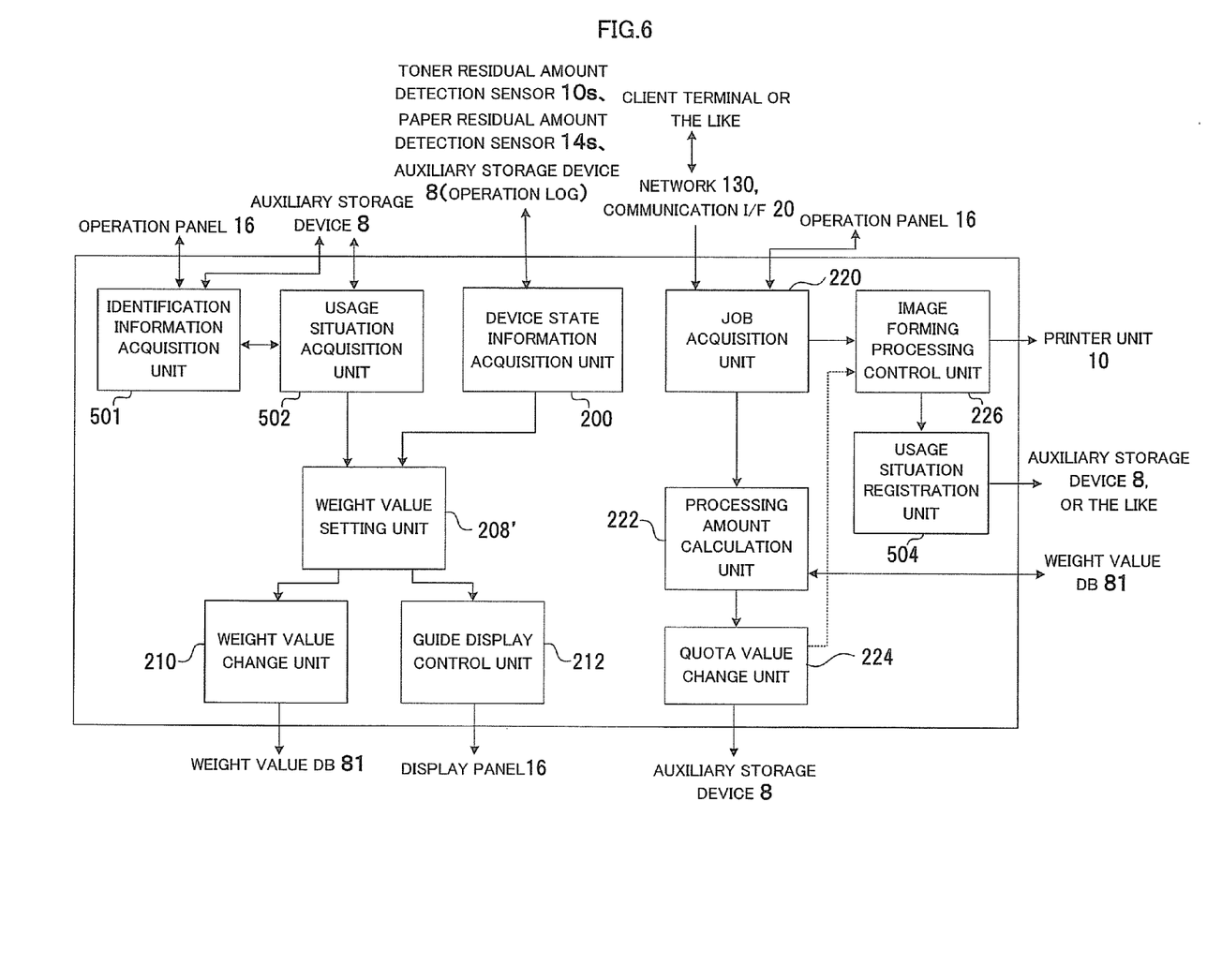
FIG. 6 is a functional block diagram explaining a function of the image forming apparatus.

Next, a second embodiment will be described. FIG. 6 is a functional block diagram explaining the image forming apparatus 1 of the second embodiment. In addition to the components of the first embodiment, the image forming apparatus 1 of the second embodiment preserves and manages the usage situation of the image forming apparatus 1 for each user or group and changes the weight value when the usage situation satisfies the predetermined conditions in the image forming apparatus 1 of the user or the group.

In addition to the functional block described in the first embodiment, the image forming apparatus 1 of the second embodiment includes an identification information acquisition unit 501, a usage situation acquisition unit 502, and a usage situation registration unit 504. Further, since the weight value setting unit of the second embodiment includes the additional function that is not included in the weight value setting unit 208 of the first embodiment, the weight value setting unit is shown by a weight value setting unit 208'. Further, the device state information acquisition unit 200 includes the toner residual amount acquisition unit 202, the paper residual amount acquisition unit 204, the paper jamming log acquisition unit 206, or the like, similar to ones shown in FIG. 3.

The identification information acquisition unit 501 acquires identification information such as ID information identifying a user when log-in processing for starting the use of the image forming apparatus 1 is performed. The identification information is acquired by the input of the user in the operation panel 16. Further, the image forming apparatus 1 includes a card reading device that reads a card on which the identification information is recorded, such that the user may acquire the identification information by reading the card by the card reading device. The identification information is acquired by the identification information acquisition unit 501 and when the identification information coincides with the identification information of the user registered beforehand in a user information database in which the identification information is stored in the auxiliary storage device 8 (or external devices such as a server connected via the network 130), the log-in processing of the user ends and the image forming apparatus 1 may be used by the user.

The usage situation acquisition unit 502 acquires the information regarding the usage situation in the image forming apparatus 1 of the user in which the identification information is acquired by the identification information acquisition unit 501. In detail, the information regarding the processing amount of the image forming processing is acquired in the image forming apparatus 1 of the logged-in user.

The information regarding the processing amount is information regarding the processing amount in the quota function described in the first embodiment and is the total processing amount of the user within the preset predetermined period. An example of the information regarding the processing amount may include only a sheet of the printed paper and may be the processing amount of the image forming processing calculated by multiplying the weight values described in the first embodiment.

The following description describes the information regarding the processing amount in the second embodiment as a sheet of paper printed by the user within the predetermined period. Further, the "predetermined period" may be, for example, one month or one year and may be a total of sheets within the entire period without setting the period.

The information regarding the usage situation acquired by the usage situation acquisition unit 502 is information registered in the database, which is stored in the external devices, or the like, connected via the auxiliary storage device 8 or the network 130 when the user executes the image forming processing by the usage situation registration unit 504 to be described below. Further, the information regarding the usage situation may be registered corresponding to the identification information in the user information database in which the identification information is registered.

The weight value setting unit 208' sets the weight value in a user unit in response to the usage situation of the user in addition to determining the weight value used when calculating the processing amount of the image forming processing, based on the information showing the state of the image forming apparatus 1 acquired from the device state information acquisition unit 200, similar to the first embodiment. That is, when the usage situation in the image forming apparatus 1 of the logged-in user that is acquired by the usage situation acquisition unit 502 satisfies the predetermined conditions, the weight values (hereinafter, referred to as "user weight value") that are uniformly multiplied are set at the time of calculating the processing amount of the image forming processing of the user.

In detail, for example, when the predetermined conditions are set as "the printed sheets are 1000 sheets or more for each month of the user", the weight value setting unit 208' sets the user weight value of the user as 0.8 when it is determined that the usage situation of the user satisfies the conditions. Further, for example, when the user weight value of user A is set as 0.8, the user A prints one sheet under the conditions of paper of A4 size (weight value: one time), color (weight value: double), one side (weight value: one time), toner save mode off (weight value: onetime), if the processing amount of a reference in the case of printing one sheet is 1 point, $1 \times 1 \times 2 \times 1 \times 1 \times 0.8 = 1.6$ and the processing amount is smaller than the processing amount ($1 \times 1 \times 2 \times 1 \times 1 = 2$) of the general case in which the user weight value is not set. Therefore, an advantage is given to user.

Similarly to the first embodiment, the weight value change unit 210 registers the changed weight value or the user weight value in the weight value DB 81 when the user weight value is newly set or changed, in addition to the case in which the weight value is changed in response to the state of the image forming apparatus 1 by the weight value setting unit 208'.

The guide display control unit 212 also displays the user weight value on the display panel 16 when the user weight value is set, while displaying the setting condition and the corresponding weight value changed on the display panel 16 when there is a weight value changed from the general weight value.

The guide display control unit 212 may display the user weight value on the display panel 16 after the log-in processing succeeds and may display the user weight value in the column of the change guide 405 of the weight value of the display screen 400 shown in FIG. 4 so as to confirm when the conditions of the image processing such as the copy processing are set in the image forming apparatus 1.

The job acquisition unit 220, the processing amount calculation unit 222, the quota value change unit 224 and the image forming processing control unit 226 have the same function as the first embodiment and therefore, the description thereof will be omitted. Further, the processing amount calculation unit 222 acquires the user weight value when the user weight value is set in the weight value DB 81 and calculates the processing amount of the user executing the image forming processing in the image forming apparatus 1 by multiplying the acquired user weight values.

The usage situation registration unit 504 updates the usage situation of the user executing the image forming processing registered in the database stored in the auxiliary storage device 8, or the like, based on the contents of the image forming processing executed in the image forming processing control unit 226. In the second embodiment, since the information regarding the processing amount that is the usage situation of the image forming apparatus is set as a sheet of the printed paper, the usage situation registration unit 504 adds the number of printed sheets of the user registered in the database at that time to the number of printed sheets of the printing executed this time. For example, the user A performs printing of 10 sheets by the image forming processing and when the printing of 100 sheets was performed at that time, the usage situation registration unit 504 updates the used sheets from 100 sheets to 110 sheets of the user A in the database.

The function of the image forming apparatus 1 of the second embodiment is described above.

Figure 7:
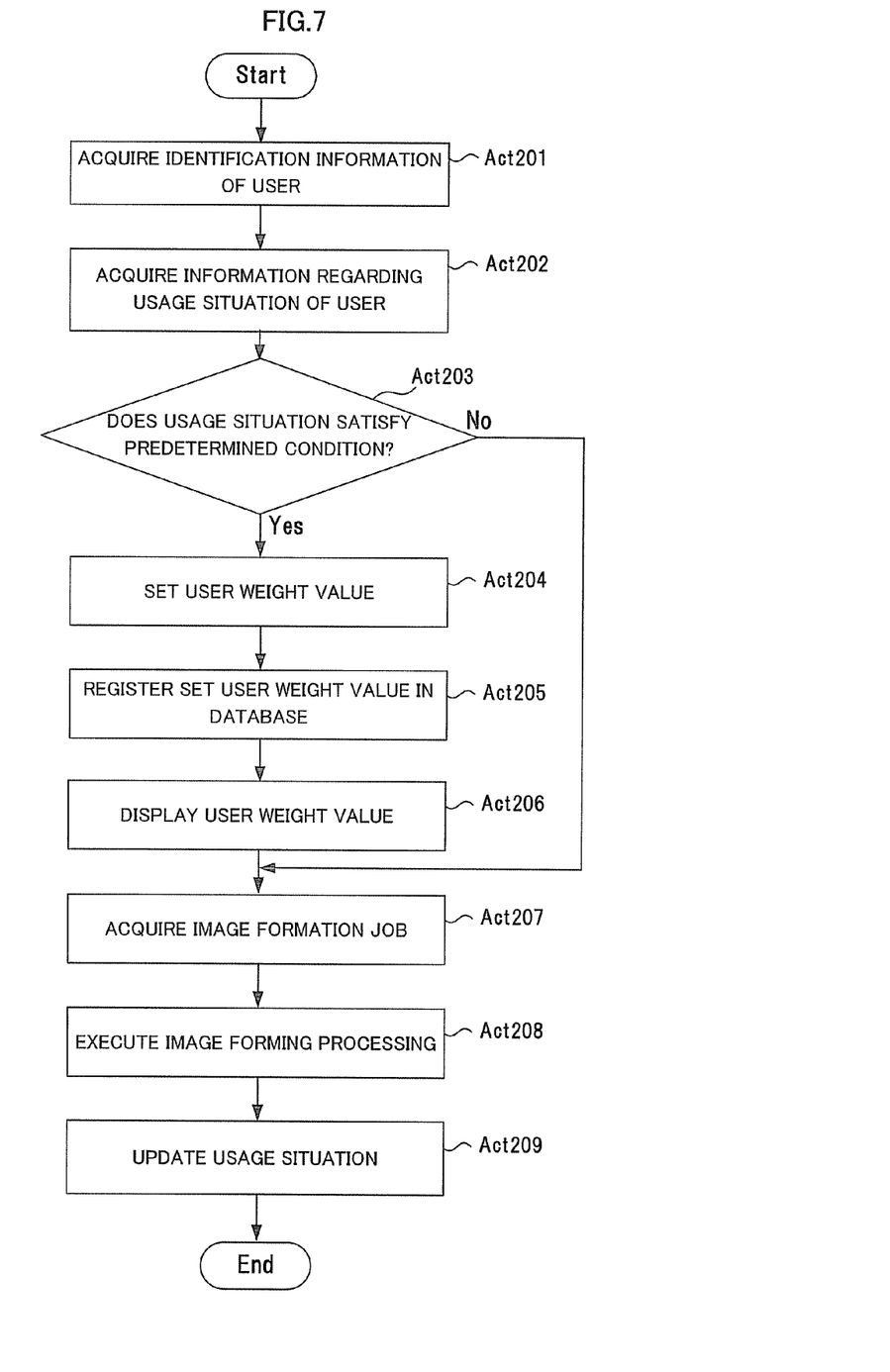
FIG. 7 is a flow chart explaining a flow of processing in the image forming apparatus.

Next, the flow of the processing in the image forming apparatus 1 of the second embodiment will be described. FIG. 7 is a flow chart explaining the flow of the processing in the image forming apparatus 1 of the second embodiment.

First, when the user logs in in order to start the use of the image forming apparatus 1, the identification information acquisition unit 501 acquires the identification information of the user via the operation panel 16 (Act 201).

Next, the usage situation acquisition unit 502 acquires the usage situation of the user in which the identification information is acquired from the database in which the usage situation is registered for each user, and which is stored beforehand in the auxiliary storage device 8, or the like (Act 202).

Next, the weight value setting unit 208' determines whether the usage situation acquired by the usage situation acquisition unit 502 satisfies the predetermined conditions (Act 203). For example, under the condition that the user weight value is set to 0.8 when the printed sheet within the predetermined period is 1000 sheets or more, it is determined whether the total number of printed sheets of the logged-in user is 1000 sheets or more within the predetermined period.

Further, the weight value setting unit 208' sets the user weight value to the preset value (in the case of the above-mentioned example, 0.8) (Act 204) when it is determined that the usage situation of the logged-in user satisfies the predetermined conditions (Yes in Act 203).

Meanwhile, the weight value setting unit 208' does not set the user weight value (in this case, proceeds to Act 207) when it is determined that the usage situation of the logged-in user does not satisfy the predetermined conditions (No in Act 203).

Next, the weight value change unit 210 registers the set user weight value in the weight value DB 81 when the user weight value is set by the weight value setting unit 208' (Act 205). Further, when the user weight value of the user is already set, the weight value is changed to a newly set weight value.

Next, the guide display control unit 212 displays the set user weight value on the display panel 16, or the like, when the user weight value is set (Act 206). Thereby, for example, when the user weight value is a weight value smaller than 1, the user may appreciate that the image forming processing may be executed in the image forming apparatus 1.

Next, when the execution of the image forming processing such as copy processing is instructed by allowing the user to operate the operation panel 16, or the like, the job acquisition unit 220 acquires the image forming job (Act 207). Further, the image forming processing control unit 226 executes the image forming processing based on the acquired image forming job (Act 208). Further, at this time, the calculation of the processing amount of the executed image forming processing by the processing amount calculation unit 222 or the subtraction, the change, or the like, of the quota value by the quota value change unit 224 are simultaneously executed.

Further, the usage situation registration unit 504 updates the usage situation of the user executing the image forming processing in the database stored in the auxiliary storage device 8, based on the contents of the executed image forming processing (Act 209).

The flow of the processing in the image forming apparatus of the second embodiment is described above.

Further, in the flow chart shown in FIG. 7, the description is made that the usage situation acquisition unit 502 after the login acquires the usage situation of the logged-in user and the weight value setting unit 208' determines whether the usage situation satisfies the predetermined conditions but this embodiment is not limited thereto. For example, after executing the image forming processing, it is determined whether the usage situation that also includes the processing amount of the image forming processing satisfies the predetermined conditions and if so, the weight value setting unit 208' may set the user weight value. Further, when the user uses the image forming apparatus 1 next time, it is possible to display the user weight value set after the last image forming processing on the display panel 16, or the like.

Further, in the flow chart shown in FIG. 7, the description is not made that the weight value setting unit 208' sets the weight value based on the state of the apparatus acquired by the device state information acquisition unit 200, but the setting processing may be executed simultaneously with the setting processing of the user weight value. For example, the device state information acquisition unit 200 acquires the information regarding the state of the apparatus to set the weight value by the weight value setting unit 208' and when the weight value is set and changed, the guide display control unit 212 may display the changed weight value on the screen for login. Thereby, the user may confirm the setting conditions in which the weight value is changed, when logging in.

Further, the second embodiment describes the case of setting the user weight value when satisfying the predetermined using conditions for each user, but is not limited thereto. For example, when the usage situation, such as the group unit including the plurality of users, the image forming apparatus unit, or the plurality of image forming apparatus unit satisfies the predetermined conditions, the weight value that is uniformly applied to the user belonging to the group or the user using the image forming apparatus may be set.

Further, the second embodiment describes the case of acquiring the usage situation of the user, the setting of the user weight value, and calculating the processing amount by applying the user weight value, when operating the operation panel 16, or the like, in the image forming apparatus 1, but is not limited thereto. The second embodiment may similarly be applied to even the case in which the printing is instructed from the client terminal connected via the network 130. In detail, when the identification information of the user is acquired from the client terminal, the usage situation corresponding to the acquired identification information is acquired from the predetermined database, and the usage situation satisfies the predetermined conditions, the weight value setting unit 208' sets the user weight value. Further, the set user weight value may be output to the client terminal and the user weight value may be displayed on the screen such as the print driver of the client terminal.

As described above, according to the present embodiments, when the usage situation of the image forming apparatus of the user satisfies the predetermined conditions, it is possible to prompt the use of the image forming apparatus by changing the weight value used to calculate the processing amount in the quota function and display the changed weight value to the user.

According to the present embodiments as described above, it is possible to prompt the user to set the conditions of the image forming processing that are suitable to set by using the display of the weight value used to calculate the processing amount of the image forming processing used in the quota function.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a residual amount detection unit that detects a residual amount of each disposable product that is accommodated in a plurality of disposable product accommodation units each of which accommodates a plurality of kinds of disposable products;
a residual amount information acquisition unit that acquires residual amount information showing a residual amount of the disposable products from the residual amount detection unit;
a determination unit that determines whether there are the disposable products in which a residual amount is disproportionately small in the plural kinds of disposable products, based on the residual amount information acquired by the residual amount information acquisition unit;
a weight value setting unit that sets a weight value used for weighting so that the weighting for calculating the processing amount of the image forming processing corresponding to setting conditions not using the disposable products determined as having a disproportionately small residual amount is relatively smaller than the weighting corresponding to other setting conditions, among the setting conditions of the image forming processing in limitation processing that limits the executed image forming processing to a predetermined processing amount set in advance, if the determination unit determines that the disposable products in which the residual amount is disproportionately small are present;
a display control unit that displays the set weight value on a screen when the weight value is set by the weight value setting unit;
a storage control unit that stores information regarding a usage situation of the image forming apparatus of a user in a predetermined storage region in association with identification information of the user;
an identification information acquisition unit that acquires the identification information of the user; and
a usage situation acquisition unit that acquires information regarding the usage situation of the image forming apparatus corresponding to the identification information acquired by the identification information acquisition unit from the predetermined storage region,
wherein the determination unit determines whether the usage situation of the user whose identification information is acquired satisfies a predetermined condition, and
the weight value setting unit sets the user weight value that is a uniformly applied weight value at the time of calculating the processing amount of the user, when it is determined that the usage situation satisfies the predetermined condition by the determination unit.

2. The apparatus according to claim 1, wherein the determination unit determines whether the disposable products in which the residual amount is disproportionately small are present in the plural kinds of disposable products by determining whether the disposal products of a kind having the smallest residual amount are reduced by a predetermined amount or more or a predetermined ratio or more as compared with the residual amount of any other disposable products, among the plural kinds of disposable products.

3. The apparatus according to claim 1, wherein the plural kinds of disposable products are coloring agents of a plurality of colors.

4. The apparatus according to claim 3, wherein the weight value setting unit sets the weight value so that weighting corresponding to setting conditions of two-color printing using two coloring agents selected from the coloring agents other than the coloring agent in which the residual amount is disproportionately small among the plural kinds of coloring agents is smaller.

5. The apparatus according to claim 1, wherein the plural kinds of disposable products are paper of plural sizes.

6. The apparatus according to claim 1, further comprising:
a storage control unit that stores paper jamming information showing an occurrence situation of paper jamming in a predetermined storage region; and
a paper jamming information acquisition unit that acquires paper jamming information stored in the storage control unit,
wherein the determination unit determines whether there is a place in which the paper jamming occurs at a predetermined frequency or more, based on the paper jamming information acquired by the paper jamming information acquisition unit, and
the weight value setting unit sets the weight value so that when it is determined that there is a place in which the paper jamming occurs at a predetermined frequency or more, the weighting corresponding to the setting conditions of the image forming processing that passes paper through the place is relatively larger as compared with the weighting corresponding to the setting conditions of the image forming processing that does not pass paper through the place.

7. A management method, comprising:
detecting a residual amount of each disposable product that is accommodated in a plurality of disposable product accommodation units each of which accommodates a plurality of kinds of disposable products;
acquiring residual amount information showing a residual amount of the disposable products by a detection of a residual amount of the disposable products;
determining whether there are the disposable products in which a residual amount is disproportionately small in the plural kinds of disposable products, based on the residual amount information acquired;
setting a weight value used for weighting so that the weighting for calculating the processing amount of the image forming processing corresponding to setting conditions not using the disposable products determined as having a disproportionately small residual amount is relatively smaller than the weighting corresponding to other setting conditions, among the setting conditions of the image forming processing in limitation processing that limits the executed image forming processing to a predetermined processing amount set in advance, if it is determined that the disposable products in which the residual amount is disproportionately small are present;
displaying the set weight value on a screen;
storing information regarding a usage situation of the image forming apparatus of a user in a predetermined storage region in association with identification information of the user;
acquiring the identification information of the user;
acquiring information regarding the usage situation of the image forming apparatus corresponding to the acquired identification information from the predetermined storage region,
determining whether the usage situation of the user whose identification information is acquired satisfies a predetermined condition, and
setting the user weight value that is a uniformly applied weight value at the time of calculating the processing amount of the user, when it is determined that the usage situation satisfies the predetermined condition.

8. The method according to claim 7, wherein the determining determines whether the disposable products in which the residual amount is disproportionately small are present in the plural kinds of disposable products by determining whether the disposal products of a kind having the smallest residual amount are reduced by a predetermined amount or more or a predetermined ratio or more as compared with the residual amount of any other disposable products, among the plural kinds of disposable products.

9. The method according to claim 7, wherein the plural kinds of disposable products are coloring agents of a plurality of colors.

10. The method according to claim 9, further comprising setting the weight value so that weighting corresponding to setting conditions of two-color printing using two coloring agents selected from the coloring agents other than the coloring agent in which the residual amount is disproportionately small among the plural kinds of coloring agents is smaller.

11. The method according to claim 7, wherein the plural kinds of disposable products are paper of plural sizes.

12. The method according to claim 7, further comprising:
storing paper jamming information showing an occurrence situation of paper jamming in a predetermined storage region;
acquiring the paper jamming information stored,
determining whether there is a place in which the paper jamming occurs at a predetermined frequency or more, based on the paper jamming information acquired, and
setting the weight value so that when it is determined that there is a place in which the paper jamming occurs at a predetermined frequency or more, the weighting corresponding to the setting conditions of the image forming processing that passes paper through the place is relatively larger as compared with the weighting corresponding to the setting conditions of the image forming processing that does not pass paper through the place.

13. A non-transitory computer-readable recording medium, comprising:
detecting a residual amount of each disposable product that is accommodated in a plurality of disposable product accommodation units each of which accommodates a plurality of kinds of disposable products;
acquiring residual amount information showing a residual amount of the disposable products by a detection of a residual amount of the disposable products;
determining whether there are the disposable products in which a residual amount is disproportionately small in the plural kinds of disposable products, based on the residual amount information acquired;
setting a weight value used for weighting so that the weighting for calculating the processing amount of the image forming processing corresponding to setting conditions not using the disposable products determined as having a disproportionately small residual amount is relatively smaller than the weighting corresponding to other setting conditions, among the setting conditions of the image forming processing in limitation processing that limits the executed image forming processing to a predetermined processing amount set in advance, if it is determined that the disposable products in which the residual amount is disproportionately small are present;
executing processing that displays the set weight value on a screen;
storing information regarding a usage situation of the image forming apparatus of a user in a predetermined storage region in association with identification information of the user;
acquiring the identification information of the user;
acquiring information regarding the usage situation of the image forming apparatus corresponding to the acquired identification information from the predetermined storage region,
determining whether the usage situation of the user whose identification information is acquired satisfies the predetermined conditions, and
setting the user weight value that is a uniformly applied weight value at the time of calculating the processing amount of the user, when it is determined that the usage situation satisfies the predetermined conditions by a computer.

14. The medium according to claim 13, wherein in the determining, the processing that determines whether the disposable products in which the residual amount is disproportionately small are present in the plural kinds of disposable products by determining whether the disposal products of a kind having the smallest residual amount are reduced by a predetermined amount or more or a predetermined ratio or more as compared with the residual amount of any other disposable products, among the plural kinds of disposable products is executed by the computer.

15. The medium according to claim 13, wherein the processing in which the plural kinds of disposable products are coloring agents of a plurality of colors is executed by the computer.

16. The medium according to claim 15, wherein the processing that sets the weight value so that weighting corresponding to setting conditions of two-color printing using two coloring agents selected from the coloring agents other than the coloring agent in which the residual amount is disproportionately small among the plural kinds of coloring agents is smaller is executed by the computer.

17. The medium according to claim 13, wherein the processing in which the plural kinds of disposable products are paper of plural sizes is executed by the computer.

18. The medium according to claim 13, wherein the processing that
stores paper jamming information showing an occurrence situation of paper jamming in a predetermined storage region;
acquires the paper jamming information stored;
determines whether there is a place in which the paper jamming occurs at a predetermined frequency or more, based on the paper jamming information acquired; and
sets the weight value so that when it is determined that there is a place in which the paper jamming occurs at a predetermined frequency or more, the weighting corresponding to the setting conditions of the image forming processing that passes paper through the place is relatively large as compared with the weighting corresponding to the setting conditions of the image forming processing that does not pass paper through the place, is executed by the computer.

* * * * *